United States Patent [19]

Adrian et al.

[11] 3,906,493
[45] Sept. 16, 1975

[54] AUTOCORRELATION TYPE SPECTRAL COMPARISON FUZE SYSTEM

[75] Inventors: Donald J. Adrian, Arlington; Carlton H. Cash, Norco, both of Calif.

[73] Assignee: The United States of America as represented by the Secretary of the Navy, Washington, D.C.

[22] Filed: Mar. 27, 1959

[21] Appl. No.: 802,577

[52] U.S. Cl. ............ 343/7 PF; 102/70.2 P; 343/14
[51] Int. Cl.² ...................... F42C 13/04; G01S 9/32
[58] Field of Search ....... 343/13, 14, 7, 100.7, 7 PF; 325/483, 323; 102/70.2 P

[56] References Cited
UNITED STATES PATENTS
2,842,764   7/1958   Harvey ................................ 343/14
2,958,862   11/1960  Rey ...................................... 343/14

Primary Examiner—Maynard R. Wilbur
Assistant Examiner—Richard E. Berger
Attorney, Agent, or Firm—Richard S. Sciascia; Joseph M. St. Amand; T. M. Phillips

EXEMPLARY CLAIM

1. A fuze system comprising means for transmitting a frequency modulated carrier signal in the direction of a target, means coupled to said transmitting means for mixing a portion of said carrier signal with a return echo from said target and producing an output signal comprising a spectrum of coherent doppler wave portion plus an incoherent wave portion due to range noise and means coupled to said mixing means for comparing the energy level of the coherent portion of said output signal with the incoherent portion of said output signal of said mixing means whereby a firing signal is obtained only when the energy level of said coherent signal exceeds the energy level of said incoherent signal by a predetermined amount.

6 Claims, 9 Drawing Figures

AUTOCORRELATION TYPE SPECTRAL COMPARISON FUZE SYSTEM

The invention described herein may be manufactured and used by or for the Government of the United States of America for governmental purposes without the payment of any royalties thereon or therefor.

This invention relates to a radio fuze system for a guided missile and more particularly to an FM/CW system in which absolute range cut-off is obtained by comparing a band of Doppler frequencies with a band of incoherent range noise in the target echo.

In this type of frequency modulated Doppler fuze system a sinusoidal frequency modulation has been utilized to give some range attenuation but the cutoff is very poor and ambiguous due to the periodic modulation.

In the application of Whiteley and Adrian, Ser. No. 566,310, filed Feb. 17, 1956, and titled Random FM Auto-Correlation Fuze System, now abandoned, a radio fuze system was disclosed having a rapid and unambiguous range cutoff by using a source of white noise to frequency modulate the carrier frequency of the transmitted signal, mixing a portion of the transmitted signal with the return echo signal from the target and filtering the mixed signal to derive an output proportional to the autocorrelation function of the power spectrum. This system is limited because the band width of the low pass filter is narrow in order to obtain the range cutoff desired while in the present fuzing systems wide receiver bands are needed because of the high closing velocities between the missiles and high speed targets. In the system disclosed by Whiteley and Adrian if the filter band width was increased to pass the expected Doppler frequencies there would be included in the spectrum of signals passed an incoherent portion known as range noise from targets at far-range. The range response would include this incoherent portion when amplified resulting in a false firing signal.

The present invention comprises a system similar to the fuze system disclosed by Whitely and Adrian in that the carrier frequency of the transmitted signal is frequency modulated by a band of white noise and the return echo signal from the target is mixed with a portion of the transmitted signal. The mixer output, however, is amplified in a band pass amplifier having a bandwidth approximately twice the maximum expected Doppler frequencies whereby both the coherent portion of the return signal plus the incoherent portion is amplified. The coherent and incoherent portions are then compared and if the coherent signal is greater by a predetermined amount than the incoherent portion the target is within lethal range of the missile and a firing signal is provided. The terms "coherent" and "incoherent" are used herein in their conventional radar terminology meaning, i.e., Coherent: composed of interdependent or related parts having a congruity arising from a common relationship; and, Incoherent: composed of independent or unrelated parts having no congruity or predictable relationship.

It is an object of the invention, therefore, to provide a fuze system for a missile that will provide a firing signal within the missile lethal range at high closing velocities.

It is a further object of the invention to provide a radio fuze system having an absolute range cutoff characteristic.

It is a sill further object of the invention to provide a fuze system capable of discriminating against many types of electronic countermeasures.

Another object of the invention is to provide a fuze system that is non-responsive to out-of-range targets regardless of size.

Another object of the invention is to provide a radio fuze system which completely discriminates against targets that are greater than a desired fixed distance.

Another object of the invention is to provide a radio fuze system responsive to in-range targets in the presence of large return signals from out-of-range objects.

Another object of the invention is to provide a fuze system which can be utilized in close proximity to a surface such as the ocean without receiving spurious signals from sea return which will trigger the fuze prematurely.

Other objects and many of the attendant advantages of this invention will be readily appreciated as the same becomes better understood by reference to the following detailed description when considered in connection with the accompanying drawings wherein.

Figure 1:
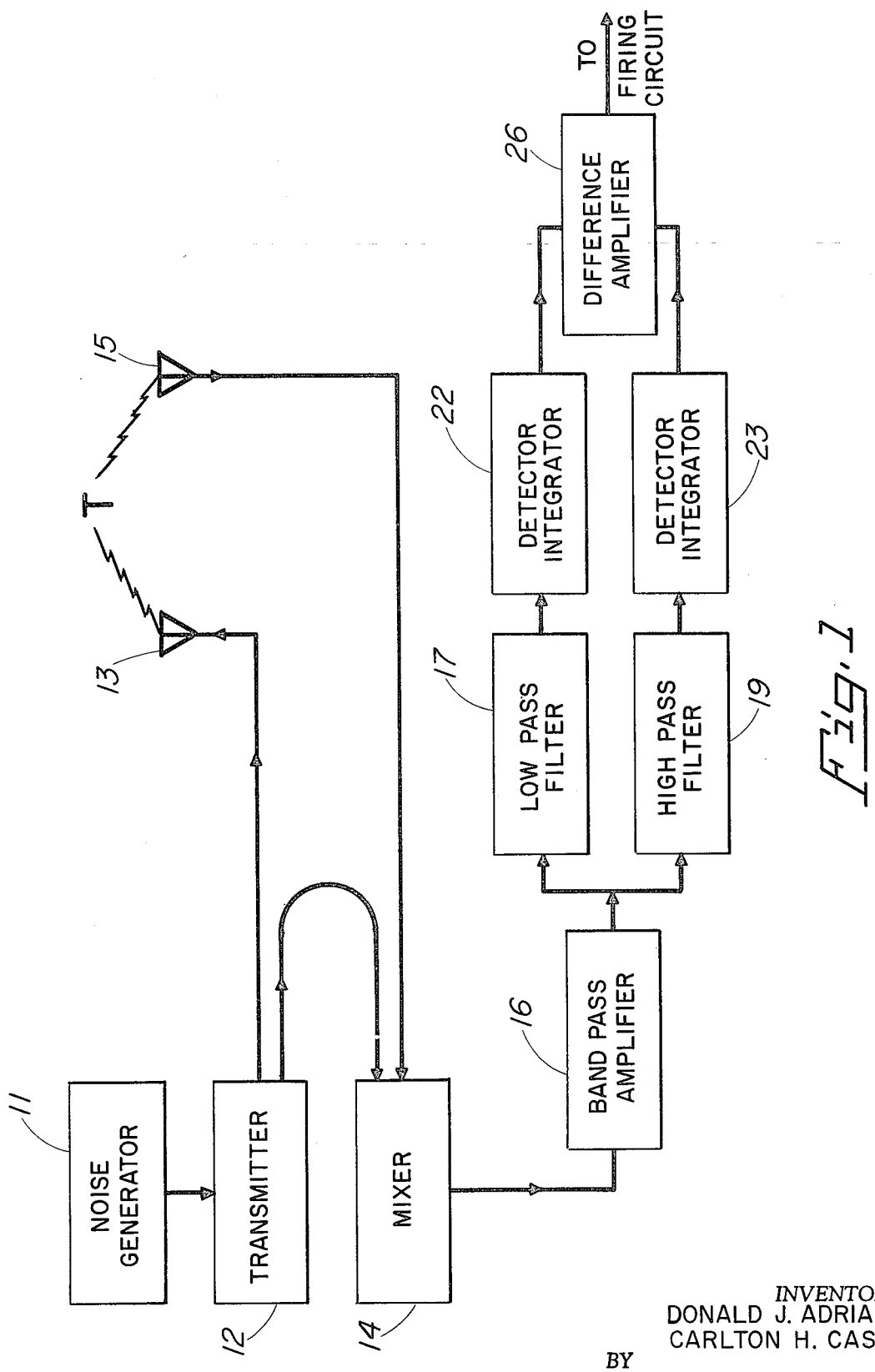
FIG. 1 is a block diagram illustrating one preferred embodiment of the present invention.

Referring now to the drawings and more particularly to FIGS. 1 through 5 the fuze is assumed to be mounted in a moving guided missile (not shown) which is guided on a path to approach the target with the RF energy from the fuze being transmitted toward the target and a return echo signal being received therefrom. A band of white noise is generated by the noise generator of block 11 and is used to frequency modulate the carrier signal of the transmitter 12 which transmits the noise modulated FM signal in the direction of the target "T" through the antenna 13.

A portion of the transmitted energy is also applied to the mixer 14 where it is combined with the return signal from the target aircraft which has been modified by the Doppler effect due to the relative movement between the missile and aircraft and is received through the antenna 15.

Figure 2:
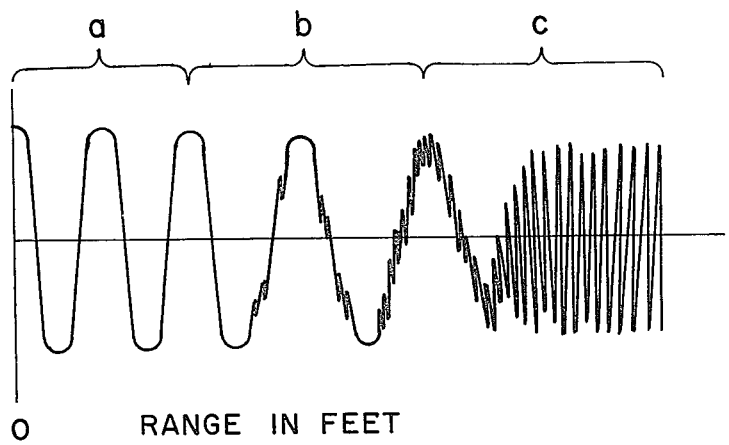
FIG. 2 is a plot of the mixer output of the present invention.

FIG. 2 is a plot of the mixer output which illustrates the change of frequency of the mixed signal with respect to range. At close range the output is a smooth periodic wave as shown in bracket *a* in FIG. 2 while at intermediate ranges the wave, enclosed by bracket *b*, becomes more complex due to the range noise that has commenced to appear in the echo signal and appears as high frequency signals superimposed on the wave. As the range increase the range noise increases until the return echo signal is no longer a smooth periodic wave but consists of an incoherent high frequency signal due to the excessive range noise and is shown within bracket c of FIG. 2.

Figure 3:
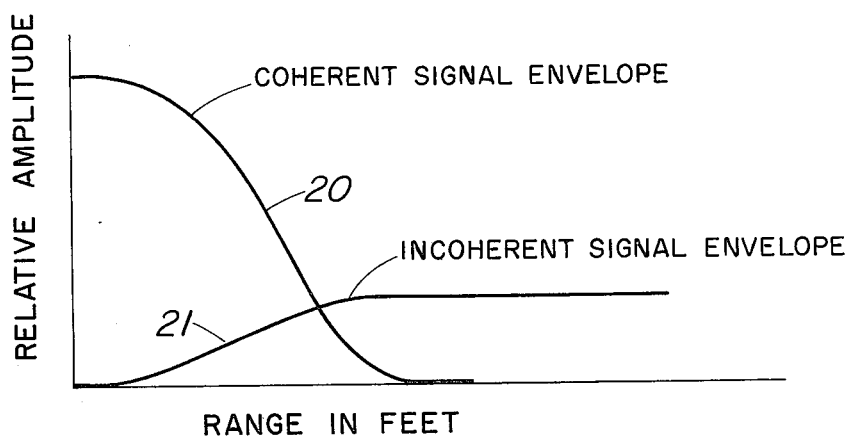
FIG. 3 is a diagram illustrating the coherent and incoherent signal components in the mixer output and are the outputs from the band pass filters shown in FIG. 1.

FIG. 3 is a plot of the coherent and incoherent signals passed by mixer 14 illustrating the relative amplitude with respect to range. Curve 20 is the envelope of the coherent signals while curve 21 is the envelope of the incoherent signals. The coherent signals, as noted above in the description of FIG. 2, are large at close or zero range and decrease rapidly as the range increases. The incoherent signals, due to range noise, are zero at close range and increase gradually to an approximately constant amplitude as the range increases.

The mixer 14 output is passed through a band pass amplifier 16 that has sufficient bandwidth to support both the coherent and incoherent signals and is at least twice the maximum expected Doppler frequency. The band of signals passed by the amplifier are fed to a low pass filter 17 and a high pass filter 19. The low pass filter 17 has a frequency response from the lowest expected Doppler frequency to the highest expected Doppler frequency and passes what is hereinafter referred to as the Doppler band. The high pass filter 19 has a frequency response from the highest expected Doppler frequency to twice the expected Doppler frequency and passes the band hereinafter referred to as the comparison band. The outputs from the filters 17 and 19 are applied to detector integrators 22 and 23 respectively.

Figure 4:
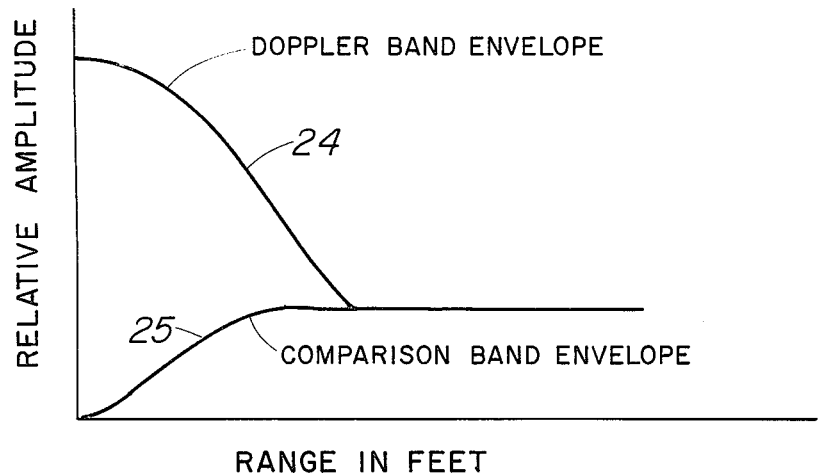
FIG. 4 is a diagram illustrating the Doppler band envelope and comparison band envelope which are the outputs from the detector integrators shown in FIG. 1.

In FIG. 4 the envelope of the Doppler band passed by filter 17, detected and integrated by detector-integrator 22, is shown as curve 24 and the comparison band envelope of the incoherent range noise signals passed by filter 19, detected and integrated by detector-integrator 23, is shown as curve 25.

Figure 5:
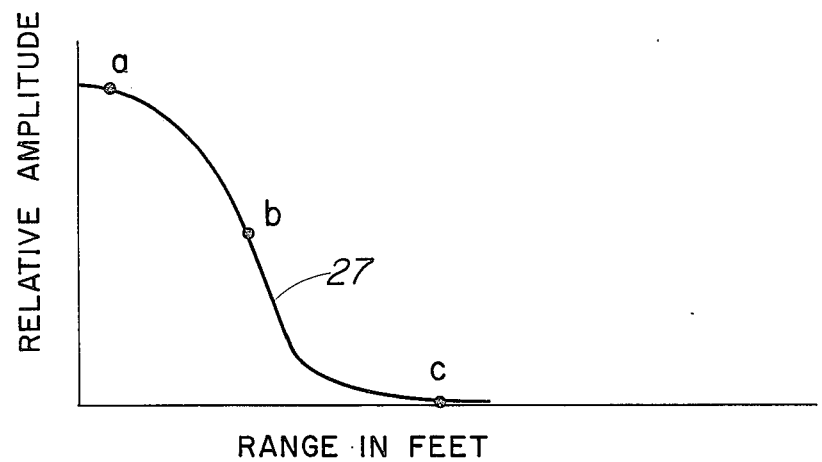
FIG. 5 is a range response curve of the embodiment shown in FIG. 1 and is the output from the difference amplifier.

For near ranges, as illustrated in FIG. 4, there is a large difference between the output from the detector-integrators 22 and 23 while for large ranges the two outputs become essentially equal. Therefore, by applying the outputs from the integrators 22–23 to a difference amplifier in which the energy output of the integrator 23 is subtracted from the energy output of the integrator 22 a range response curve 27 shown in FIG. 5 is obtained. Point a on curve 27 represents the approximate center of the coherent signal shown in bracket a in FIG. 2 while points b and c correspond respectively to the center of brackets b and c in FIG. 2. By setting the gain of the detector-integrator 23 slightly higher than the gain of detector integrator 22 the output from the difference amplifier 26 for small ranges will be relatively large and positive while the output for large ranges will be relatively small and even negative if the difference in gain is set high enough. Therefore, when the firing circuit is designed to trigger the fuze from a positive signal only, absolute range cutoff can be obtained and the effects of the negative signals at large ranges will have little effect on target intercepts in-range.

Figure 6:
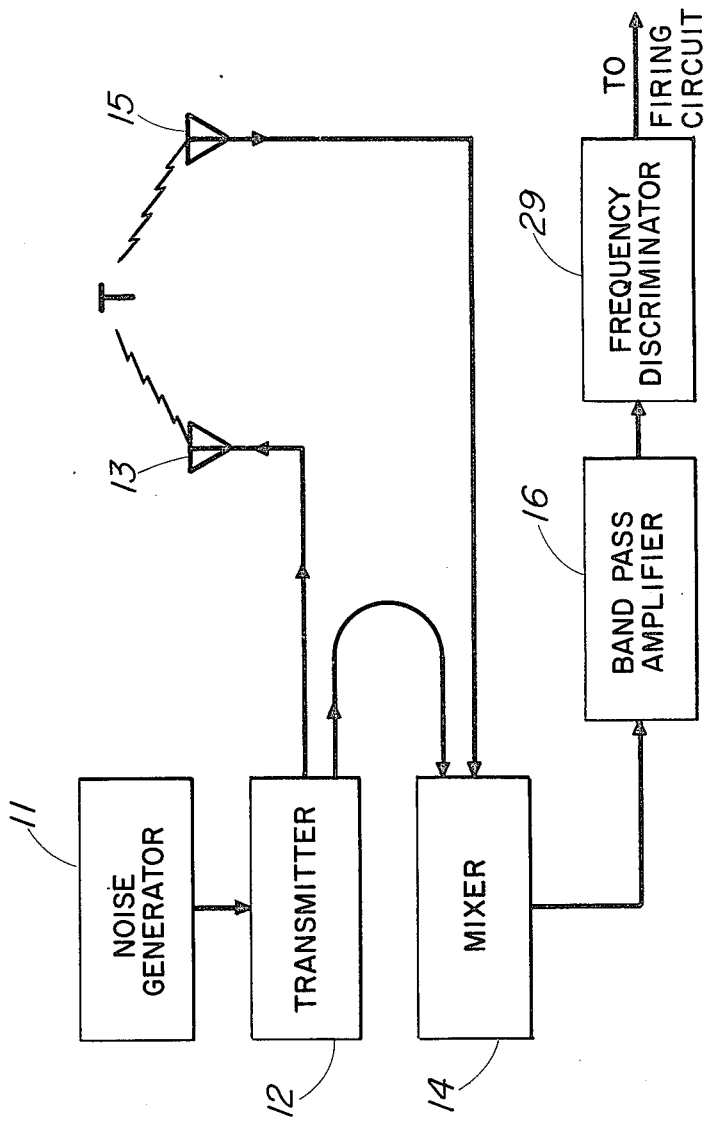
FIG. 6 is a block diagram illustrating a second embodiment of the present invention.

The system shown in FIG. 6 is the same as the system described above up through the band pass amplifier 16. However, in this system the output from the amplifier 16 is applied to a balanced frequency discriminator 29 that is centered just above the maximum expected Doppler frequency whereby for in-range target reflectors, when most of the energy from the amplifier 16 is in the Doppler frequency, the discriminator has a large positive output and for far-range reflectors the energy output of amplifier 16 is spread approximately evenly over the amplifier band and the discriminator 29 output is zero.

Figure 7:
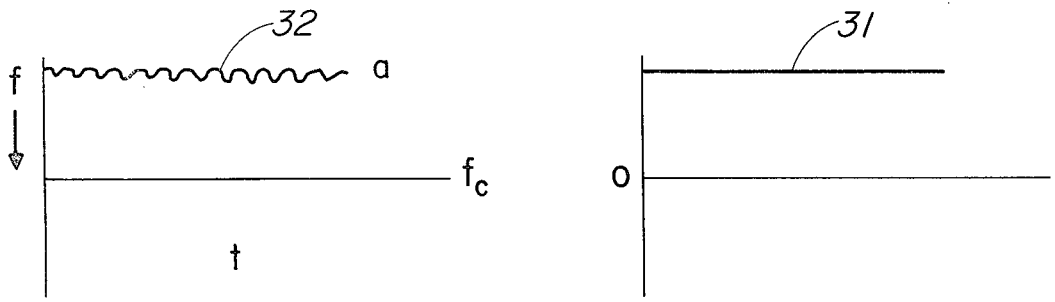
FIGS. 7–9 are illustrations of the two steps in the frequency discriminator shown in FIG. 6 from close-in targets shown in FIG. 7 to far-targets shown in FIG. 9.
Figure 8:
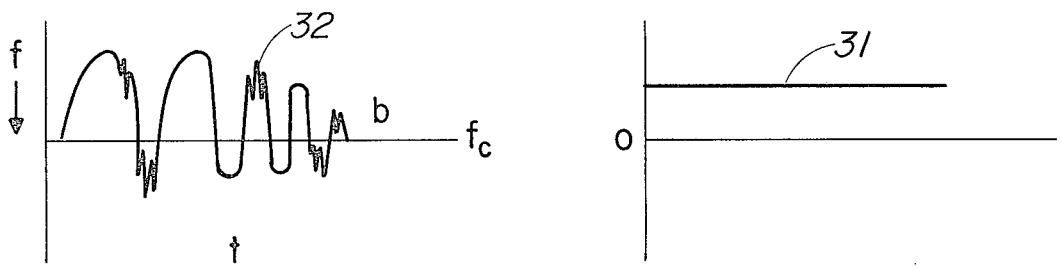
Figure 9:
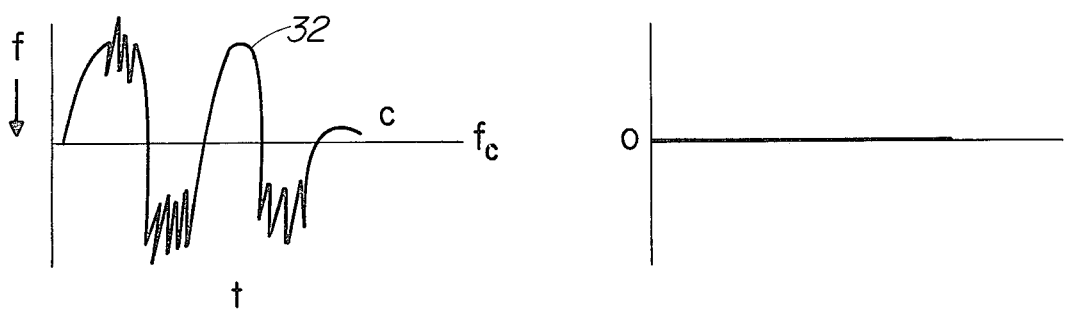

With reference to FIGS. 7–9 a plot of the frequency discriminator 29 output 31 with respect to the frequency content of the amplifier 16 output is illustrated. The curves plotted on the left hand side of each figure represents the frequency response at various ranges with the ordinate of the graph representing the frequency $f$ of the amplifier 16 output with the frequency increasing in an inverse order on the graph. The abscissa of this graph represents time $t$ and the line $f_c$ represents the center frequency of the frequency discriminator 29.

In FIG. 7 the plot on the left hand side represents a band 32 of coherent signals such as the Doppler signal within bracket a of FIG. 2 where the frequency component is of a relatively low frequency and when integrated by the discriminator and compared with the zero incoherent or high frequency component will give an output 31 of high amplitude shown on the right in FIG. 7.

Since the frequency discriminator 29 is designed so that signals appearing in the Doppler or coherent band and passed by the amplifier 16 will give an output of an opposite polarity to the signals that appear in the high frequency or incoherent band, the amplitude of the discriminator output 31 will decrease as shown in FIG. 8 as the incoherent signals appear on the coherent signal in the band 32 shown as bracket b of FIG. 2. In other words, the part of the band 32 above $f_c$ in FIG. 8 represents the amount of coherent signals passed while the part of the band 32 below $f_c$ represents the incoherent or range noise signals. Since the amount of coherent signals within this range is greater than the amount of high frequency incoherent signals, there will be an output signal 31 from the frequency discriminator 29, however, its amplitude will be less than the amplitude of the signal 31 shown in FIG. 7.

FIG. 9 is a plot of the range response for far-targets in which the incoherent signals are either equal to or greater than the coherent signals whereby the output 31 from the frequency discriminator 29 is either zero or a negative value. Since the firing circuit is designed, as noted above, to trigger on a positive signal output from the frequency discriminator 29, absolute range cutoff is obtained and negative signals at ranges within the area covered by bracket c will have little effect on target intercepts in-range.

Electronic countermeasures used against either of the two systems disclosed or any system developed within the scope of this invention would be spread evenly over the receiver hand with a resulting zero output to the firing circuit. Also by amplifying at the Doppler frequencies all of the target return signal energy is utilized instead of throwing away some of the energy as in the prior IF system.

Obviously many modifications and variations of the present invention are possible in the light of the above teachings. It is therefore to be understood that within the scope of the appended claims the invention may be practiced otherwise than as specifically described.

What is claimed is:

1. A fuze system comprising means for transmitting a frequency modulated carrier signal in the direction of a target, means coupled to said transmitting means for mixing a portion of said carrier signal with a return echo from said target and producing an output signal comprising a spectrum of coherent doppler wave portion plus an incoherent wave portion due to range noise, and means coupled to said mixing means for comparing the energy level of the coherent portion of said output signal with the incoherent portion of said output signal of said mixing means whereby a firing signal is obtained only when the energy level of said coherent signal exceeds the energy level of said incoherent signal by a predetermined amount.

2. A radio fuze system comprising means for frequency modulating a carrier frequency with a band of noise, means coupling to said modulating means for transmitting said frequency modulated carrier signal in the direction of a target, receiving antenna means for receiving echos of said transmitted signal from said target means coupled to said transmitting means and to said receiving antenna means for mixing a portion of said transmitted signal and a return echo signal from said target and producing an output signal comprising a band of coherent signals for in-range targets and a band of incoherent signals for out-of-range targets and means coupled to said mixing means for comparing the energy level of the coherent signals with the incoherent signals of said mixing means output whereby a firing signal is obtained only when the energy level of said coherent signals exceeds the energy level of said incoherent signals by a predetermined amount.

3. In a random FM autocorrelation fuze system wherein a noise modulated signal is transmitted and the receiver bandwidths are large to accommodate expected Doppler signals from a target, the improvement comprising means for mixing a return target echo with a portion of said transmitted signal and producing an output signal comprising a spectrum of coherent doppler wave portion plus an incoherent wave portion due to range noise coupled to said mixing means, for comparing the energy level of the coherent signals with the incoherent signals of said mixing means output whereby a firing signal is obtained only when the energy level of said coherent signals exceeds the energy level of said incoherent signals by a predetermined amount.

4. A radio fuze system responsive to in-range targets in the presence of large return signals from out-of-range reflectors comprising, means for transmitting a signal having its carrier frequency modulated by a band of white noise, receiving antenna means for receiving echoes of the transmitted signal means coupled to said said transmitting and receiving means for mixing a portion of said FM signal with a return echo signal modified by the relative movement between the fuze and a target and producing an output signal comprising coherent Doppler signals for in-range targets and incoherent range noise signals for out-of-range reflectors and means coupled to said mixing means for comparing the energy levels of said coherent and incoherent signals whereby a firing signal is derived only when said coherent signal energy level exceeds said incoherent signal energy level by a predetermined amount.

5. The fuze system of claim 4 in which said comparison means comprises means for detecting and integrating a band of said coherent signals and a band of said incoherent signals, and means coupled to said detecting and integrating means for comparing the envelopes of said integrated signals to derive said firing signal.

6. The fuze system of claim 5 in which said comparison means comprises means for amplifying said coherent and incoherent signals and frequency discriminator means coupled to said amplifying means for comparing the frequency band of said coherent signals with the frequency band of said incoherent signals to produce a firing signal when the band of coherent signals is greater than the band of incoherent signals.

* * * * *